United States Patent
Giles et al.

(10) Patent No.: US 6,357,009 B1
(45) Date of Patent: Mar. 12, 2002

(54) SECURE ENABLEMENT OF A PROCESSING ENTITY

(75) Inventors: Vincent Giles, Seyssins; Danièle Beccari, Paris, both of (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/242,627
(22) PCT Filed: Aug. 9, 1997
(86) PCT No.: PCT/EP97/04410
§ 371 Date: May 3, 1999
§ 102(e) Date: May 3, 1999
(87) PCT Pub. No.: WO98/08155
PCT Pub. Date: Feb. 26, 1998

(30) Foreign Application Priority Data

Aug. 20, 1996 (EP) ............................................. 96410090

(51) Int. Cl.[7] ................................................ G06F 11/30
(52) U.S. Cl. ...................................................... 713/200
(58) Field of Search ................................. 713/200, 201, 713/202, 182, 185, 189, 193; 380/21, 25

(56) References Cited

U.S. PATENT DOCUMENTS 5,467,396 A    11/1995  Schossow
5,710,814 A  *  1/1998  Klemba et al. ................. 380/9
5,740,248 A  *  4/1998  Fieres et al. .................... 380/25
5,841,869 A  * 11/1998  Merkling et al. .............. 380/25

FOREIGN PATENT DOCUMENTS

EP    0 234 100 A2    9/1987
EP    0 566 512 A1   10/1993

* cited by examiner

Primary Examiner—Thomas M. Heckler

(57) ABSTRACT

A control entity generates a set of control values for input to a processing entity that needs these control values for its proper working. The control entity can only generate the correct control values when enabled by an enabling entity, such as a smart card. The enabling and control entities each have a touch point word generator for respectively generating first and second identical successions of touch-point words. In addition, the enabling entity has a build-word generator for producing from each touch point word of the first succession, a corresponding build word having a value dependent on the value of the touch-point word concerned and its order position in the first succession. The enabling entity passes these build words to the control entity where they are used together with the corresponding touch point words of the second succession, to produce a series of command word values serving as the required control values. As the build words are of different values and are needed to generate the correct values, it is difficult for an attacker to modify the control entity in a way avoiding the need for the enabling entity to be present.

23 Claims, 11 Drawing Sheets

| ARGUMENT TABLE (ENABLING ENTITY) | | STEP ($2^k$ in total) | | | | | | |
|---|---|---|---|---|---|---|---|---|
| | | 1 | 2 | | i | | | $2^k$ |
| TOUCH POINT VALUE ($2^n$ in total) | 0 | $a_{0,1}$ | $a_{0,2}$ | | $a_{0,i}$ | | | |
| | 1 | $a_{1,1}$ | $a_{1,2}$ | | $a_{1,i}$ | | | |
| | | | | | | | | |
| | m | $a_{m,1}$ | $a_{m,2}$ | | $a_{m,i}=x$ | | | |
| | | | | | | | | |
| | $2^n-1$ | $a_{2^n-1,1}$ | $a_{2^n-1,2}$ | | $a_{2^n-1,i}$ | | | $a_{2^n-1,2}$ |

FIG. 5

| COMMAND WORD TABLE (CONTROL ENTITY) | | FUNCTION ($2^n$ in total) | | | | | |
|---|---|---|---|---|---|---|---|
| | | $F_0$ | $F_1$ | | $F_m$ | | $F_{2^n-1}$ |
| ARG. (max of $2^k$ and $2^n$) | 0 | $C_5$ | $C_2$ | | | | |
| | 1 | $C_3$ | $C_1$ | | | | |
| | 2 | $C_1$ | $C_4$ | | | | |
| | | | | | | | |
| | x | | | | $C_i$ | | |
| | | | | | | | |
| | $2^{k+n}-1$ | | | | | | |

FIG. 6

| ARGUMENT TABLE (ENABLING ENTITY) | | STEP ($2^k$, k=3) | | | | | | | |
|---|---|---|---|---|---|---|---|---|---|
| | | 1 | 2 | 3 | 4 | 5 | 6 | 7 | 8 |
| TOUCH POINT VALUE ($2^n$, n=2) | 0 | 7 | 2 | 5 | 6 | 0 | 4 | 1 | 3 |
| | 1 | 3 | 7 | 2 | 5 | 6 | 0 | 4 | 1 |
| | 2 | 1 | 3 | 7 | 2 | 5 | 6 | 0 | 4 |
| | 3 | 4 | 1 | 3 | 7 | 2 | 5 | 6 | 0 |

FIG. 7

| COMMAND WORD TABLE (CONTROL ENTITY) | | FUNCTION ($2^n$, n=2) | | | |
|---|---|---|---|---|---|
| | | $F_0$ | $F_1$ | $F_2$ | $F_3$ |
| ARG. ($2^k$, k=3) | 0 | $C_5$ | $C_6$ | $C_7$ | $C_8$ |
| | 1 | $C_7$ | $C_8$ | $C_1$ | $C_2$ |
| | 2 | $C_2$ | $C_3$ | $C_4$ | $C_5$ |
| | 3 | $C_8$ | $C_1$ | $C_2$ | $C_3$ |
| | 4 | $C_6$ | $C_7$ | $C_8$ | $C_1$ |
| | 5 | $C_3$ | $C_4$ | $C_5$ | $C_6$ |
| | 6 | $C_4$ | $C_5$ | $C_6$ | $C_7$ |
| | 7 | $C_1$ | $C_2$ | $C_3$ | $C_4$ |

FIG. 8

| ARGUMENT TABLE (ENABLING ENTITY) | | STEP ($2^k$, k=2) | | | |
|---|---|---|---|---|---|
| | | 1 | 2 | 3 | 4 |
| TOUCH POINT VALUE ($2^n$, n=3) | 0 | 7 | 3 | 1 | 4 |
| | 1 | 2 | 7 | 3 | 1 |
| | 2 | 5 | 2 | 7 | 3 |
| | 3 | 6 | 5 | 2 | 7 |
| | 4 | 0 | 6 | 5 | 2 |
| | 5 | 4 | 0 | 6 | 5 |
| | 6 | 1 | 4 | 0 | 6 |
| | 7 | 3 | 1 | 4 | 0 |

FIG. 9

| COMMAND WORD TABLE (CONTROL ENTITY) | | FUNCTION ($2^n$, n=3) | | | | | | | |
|---|---|---|---|---|---|---|---|---|---|
| | | $F_0$ | $F_1$ | $F_2$ | $F_3$ | $F_4$ | $F_5$ | $F_6$ | $F_7$ |
| ARG. ($2^k$, k=2) | 0 | | | | | | $C_1$ | $C_2$ | $C_3$ | $C_4$ |
| | 1 | $C_3$ | $C_4$ | | | | | $C_1$ | $C_2$ |
| | 2 | | $C_1$ | $C_2$ | $C_3$ | $C_4$ | | | |
| | 3 | $C_2$ | $C_3$ | $C_4$ | | | | | $C_1$ |
| | 4 | $C_4$ | | | | | $C_1$ | $C_2$ | $C_3$ |
| | 5 | | | $C_1$ | $C_2$ | $C_3$ | $C_4$ | | |
| | 6 | | | | $C_1$ | $C_2$ | $C_3$ | $C_4$ | |
| | 7 | $C_1$ | $C_2$ | $C_3$ | $C_4$ | | | | |

$TPV_{(EE)} = 6$ $A_{20} = 12$ $$TPV_{(CE)} = 6$$

$A_{20} = $

| arg. | $F_0$ | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | $F_{14}$ | $F_{15}$ |
|---|---|---|---|---|---|---|---|---|---|---|---|---|---|---|---|---|
| 0 | 00 | 00 | 00 | 00 | 00 | 00 | 00 | 00 | 00 | 00 | 00 | 00 | 00 | 00 | 00 | 00 |
| 1 | 00 | 01 | 01 | 11 | 01 | 00 | 01 | 00 | 01 | 00 | 01 | 00 | 01 | 00 | 01 | 00 |
| 2 | 01 | 00 | 01 | 00 | 01 | 01 | 11 | 01 | 00 | 01 | 00 | 01 | 00 | 01 | 00 | 01 |
| 3 | 01 | 00 | 01 | 00 | 01 | 00 | 01 | 00 | 01 | 00 | 01 | 00 | 01 | 01 | 00 | 01 |
| 4 | 00 | 00 | 00 | 00 | 00 | 00 | 00 | 00 | 00 | 00 | 00 | 00 | 00 | 00 | 00 | 00 |
| 5 | 00 | 01 | 00 | 01 | 00 | 01 | 01 | 00 | 01 | 00 | 01 | 00 | 01 | 00 | 01 | 00 |
| 6 | 01 | 11 | 01 | 00 | 01 | 00 | 01 | 00 | 01 | 00 | 01 | 00 | 01 | 00 | 01 | 00 |
| 7 | 01 | 00 | 01 | 00 | 01 | 00 | 01 | 00 | 01 | 00 | 01 | 00 | 01 | 00 | 01 | 01 |
| 8 | 00 | 01 | 00 | 01 | 01 | 00 | 01 | 00 | 01 | 00 | 01 | 01 | 11 | 01 | 00 | 01 |
| 9 | 00 | 00 | 00 | 00 | 00 | 00 | 00 | 00 | 00 | 00 | 00 | 00 | 00 | 00 | 00 | 00 |
| 10 | 01 | 00 | 01 | 01 | 00 | 01 | 00 | 01 | 00 | 01 | 00 | 01 | 00 | 01 | 00 | 01 |
| 11 | 01 | 00 | 01 | 01 | 11 | 01 | 00 | 01 | 00 | 01 | 00 | 01 | 00 | 01 | 00 | 01 |
| 12 | 00 | 01 | 00 | 01 | 00 | 01 | 00 | 01 | 00 | 01 | 00 | 01 | 00 | 01 | 00 | 01 |
| 13 | 11 | 01 | 00 | 01 | 00 | 01 | 00 | 01 | 00 | 01 | 00 | 01 | 01 | 00 | 01 | 00 |
| 14 | 00 | 01 | 00 | 01 | 00 | 01 | 00 | 01 | 00 | 01 | 01 | 00 | 01 | 00 | 01 | 00 |
| 15 | 01 | 01 | 00 | 01 | 00 | 01 | 00 | 01 | 00 | 01 | 00 | 01 | 00 | 01 | 01 | 11 |
| 16 | 00 | 00 | 00 | 00 | 00 | 00 | 00 | 00 | 00 | 00 | 00 | 00 | 00 | 00 | 00 | 00 |
| 17 | 00 | 01 | 00 | 01 | 00 | 01 | 00 | 01 | 00 | 01 | 00 | 01 | 01 | 11 | 01 | 00 |
| 18 | 01 | 00 | 01 | 00 | 01 | 00 | 01 | 00 | 01 | 00 | 01 | 00 | 01 | 01 | 11 | 01 |
| 19 | 01 | 00 | 01 | 00 | 01 | 01 | 00 | 01 | 00 | 01 | 00 | 01 | 00 | 01 | 00 | 01 |
| 20 | 00 | 01 | 00 | 01 | 00 | 01 | 01 | 11 | 01 | 00 | 01 | 00 | 01 | 00 | 01 | 00 |
| 21 | 00 | 01 | 00 | 01 | 00 | 01 | 00 | 01 | 01 | 00 | 01 | 00 | 01 | 00 | 01 | 00 |
| 22 | 01 | 00 | 01 | 00 | 01 | 00 | 01 | 01 | 11 | 01 | 00 | 01 | 00 | 01 | 00 | 00 |
| 23 | 01 | 00 | 01 | 00 | 01 | 00 | 01 | 00 | 01 | 01 | 00 | 01 | 00 | 01 | 00 | 01 |
| 24 | 01 | 00 | 01 | 00 | 01 | 00 | 01 | 01 | 00 | 01 | 00 | 01 | 00 | 01 | 00 | 01 |
| 25 | 00 | 01 | 01 | 00 | 01 | 00 | 01 | 00 | 01 | 00 | 01 | 00 | 01 | 00 | 01 | 01 |
| 26 | 01 | 00 | 01 | 00 | 01 | 00 | 01 | 00 | 01 | 00 | 01 | 01 | 00 | 01 | 00 | 01 |
| 27 | 00 | 01 | 00 | 01 | 01 | 11 | 01 | 00 | 01 | 00 | 01 | 00 | 01 | 00 | 01 | 00 |
| 28 | 00 | 01 | 00 | 01 | 00 | 01 | 00 | 01 | 00 | 01 | 01 | 11 | 01 | 00 | 01 | 00 |
| 29 | 00 | 01 | 00 | 01 | 00 | 01 | 00 | 01 | 01 | 11 | 01 | 00 | 01 | 00 | 01 | 00 |
| 30 | 01 | 01 | 11 | 01 | 00 | 01 | 00 | 01 | 00 | 01 | 00 | 01 | 00 | 01 | 00 | 01 |
| 31 | 01 | 00 | 01 | 00 | 01 | 00 | 01 | 00 | 01 | 01 | 11 | 01 | 00 | 01 | 00 | 01 |

FIG. 15

| CLK number i | @HeartBeat t | | | | @HeartBeat t+1 | | | | DES_EN$_i$ |
|---|---|---|---|---|---|---|---|---|---|
| | TPV$_i$ | F$_{TPVi}$ | A$_i$ = a$_{TPVi,i}$ | | TPV$_i$ | F$_{TPVi}$ | A$_i$ = a$_{TPVi,i}$ | | |
| 1 | 0110 | 6 | F$_6$ | a$_{6,1}$ | 20 | 0011 | 3 | F$_3$ | a$_{3,1}$ | 11 | 01 |
| 2 | 1000 | 8 | F$_8$ | a$_{8,2}$ | 31 | 1100 | 12 | F$_{12}$ | a$_{12,2}$ | 18 | 01 |
| 3 | 1101 | 13 | F$_{13}$ | a$_{13,3}$ | 25 | 1001 | 9 | F$_9$ | a$_{9,3}$ | 7 | 00 |
| 4 | 1111 | 15 | F$_{15}$ | a$_{15,4}$ | 19 | 1111 | 15 | F$_{15}$ | a$_{15,4}$ | 19 | 01 |
| 5 | 0000 | 0 | F$_0$ | a$_{0,5}$ | 27 | 1110 | 14 | F$_{14}$ | a$_{14,5}$ | 19 | 00 |
| 6 | 0101 | 5 | F$_5$ | a$_{5,6}$ | 28 | 1000 | 8 | F$_8$ | a$_{8,6}$ | 18 | 01 |
| 7 | 1010 | 10 | F$_{10}$ | a$_{10,7}$ | 10 | 0100 | 4 | F$_4$ | a$_{4,7}$ | 28 | 00 |
| 8 | 0011 | 3 | F$_3$ | a$_{3,8}$ | 28 | 1111 | 15 | F$_{15}$ | a$_{15,8}$ | 23 | 01 |
| 9 | 1100 | 12 | F$_{12}$ | a$_{12,9}$ | 24 | 1100 | 12 | F$_{12}$ | a$_{12,9}$ | 24 | 00 |
| 10 | 1001 | 9 | F$_9$ | a$_{9,10}$ | 19 | 0010 | 2 | F$_2$ | a$_{2,10}$ | 7 | 01 |
| 11 | 0110 | 6 | F$_6$ | a$_{6,11}$ | 10 | 0111 | 7 | F$_7$ | a$_{7,11}$ | 8 | 00 |
| 12 | 0001 | 1 | F$_1$ | a$_{1,12}$ | 17 | 0100 | 4 | F$_4$ | a$_{4,12}$ | 25 | 01 |
| 13 | 1110 | 14 | F$_{14}$ | a$_{14,13}$ | 3 | 0011 | 3 | F$_3$ | a$_{3,13}$ | 25 | 00 |
| 14 | 0010 | 2 | F$_2$ | a$_{2,14}$ | 25 | 1001 | 9 | F$_9$ | a$_{9,14}$ | 23 | 01 |
| 15 | 0100 | 4 | F$_4$ | a$_{4,15}$ | 19 | 1100 | 12 | F$_{12}$ | a$_{12,15}$ | 3 | 01 |
| 16 | 1000 | 8 | F$_8$ | a$_{8,16}$ | 14 | 1001 | 9 | F$_9$ | a$_{9,16}$ | 26 | 00 |
| 17 | 0111 | 7 | F$_7$ | a$_{7,17}$ | 14 | 0110 | 6 | F$_6$ | a$_{6,17}$ | 23 | 01 |
| 18 | 1011 | 11 | F$_{11}$ | a$_{11,18}$ | 6 | 0000 | 0 | F$_0$ | a$_{0,18}$ | 8 | 00 |
| 19 | 1111 | 15 | F$_{15}$ | a$_{15,19}$ | 2 | 0100 | 4 | F$_4$ | a$_{4,19}$ | 23 | 01 |
| 20 | 0110 | (6) | F$_6$ | a$_{6,20}$ | (12) | 1111 | 15 | F$_{15}$ | a$_{15,20}$ | 20 | (00) |
| 21 | 1110 | 14 | F$_{14}$ | a$_{14,21}$ | 20 | 1001 | 9 | F$_9$ | a$_{9,21}$ | 30 | 01 |
| 22 | 0010 | 2 | F$_2$ | a$_{2,22}$ | 14 | 1011 | 11 | F$_{11}$ | a$_{11,22}$ | 27 | 00 |
| 23 | 0111 | 7 | F$_7$ | a$_{7,23}$ | 30 | 0001 | 1 | F$_1$ | a$_{1,23}$ | 14 | 01 |
| 24 | 0100 | 4 | F$_4$ | a$_{4,24}$ | 13 | 1111 | 15 | F$_{15}$ | a$_{15,24}$ | 28 | 00 |
| 25 | 0011 | 3 | F$_3$ | a$_{3,25}$ | 13 | 0110 | 6 | F$_6$ | a$_{6,25}$ | 1 | 01 |
| 26 | 1001 | 9 | F$_9$ | a$_{9,26}$ | 20 | 1110 | 14 | F$_{14}$ | a$_{14,26}$ | 7 | 00 |
| 27 | 1010 | 10 | F$_{10}$ | a$_{10,27}$ | 29 | 0000 | 0 | F$_0$ | a$_{0,27}$ | 3 | 01 |
| 28 | 1111 | 15 | F$_{15}$ | a$_{15,28}$ | 15 | 0100 | 4 | F$_4$ | a$_{4,28}$ | 11 | 11 |

FIG. 16

SECURE ENABLEMENT OF A PROCESSING ENTITY

FIELD OF THE INVENTION

The present invention relates to the secure enablement of a processing entity and in particular, but not exclusively, to the enablement of a cryptographic unit only whilst an enabling entity is present.

In the present context, the term "secure" is used in a relative sense to indicate that the security features provided are sufficiently hard to circumvent as to make it unattractive to try to do so. Of course, this judgement will depend on the benefits to be obtained by circumventing the security features and some embodiments of the present invention are only suitable for low value applications whilst other embodiments are suitable for higher valued applications.

BACKGROUND OF THE INVENTION

FIG. 1 illustrates a known arrangement in which a processing entity 10 is enabled/disabled by a signal passed to it over line 16 from a control entity 11. The signal is used, for example to control a hardware gate placed in a clock signal line of the processing entity such that if this gate is disabled, the processing entity is unable to function at all. To cause the control entity to output an enabling signal on line 16, the latter must be supplied with the correct password from an enabling entity 12 (which may be, for example, a smartcard or a security server. The supplied password is temporarily stored in a register 14 of the control entity 11 and then compared in comparison block 15 with a reference copy of the correct password held in register 13. If the supplied password matches the reference word, the comparison block outputs an enabling signal on line 16. The control entity 11 and processing entity 10 are, for example, fabricated in the same chip. In a more sophisticated version of this general arrangement, rather than storing a copy of the correct password in register 13, a signature of this word is stored, this signature being that produced by passing the password through a one-way function; when a password is supplied to the control entity it is first subject to the same one-way function before being compared with the signature stored in register 13. This latter arrangement is more secure as the correct password is not stored in clear in register 13.

Examples of this general type of arrangement may be found in EP-A-0,566,512 (Innovatron) and in our co-pending European Patent Application No. 95410047.5.

The FIG. 1 arrangement is vunerable to a number of attacks. For example, it is possible for a sophisticated attacker to force all bits in registers 13 and 14 to a common state so that the comparison block always outputs an enabling signal. Alternatively, the state of the line 16 could be forced to its enable state. These attacks can be effected by persons only having access to the control entity 11. Where an attacker also has access to the enabling entity 12, then other attacks are also possible. For example, the correct password could simply be copied whilst being passed from the enabling entity to the control entity, the copied version of the password then being replayed to enable subsequent operation of the processing entity (it may be desired to do this if use of the enabling entity is somehow restricted, for example, by date expiry or by units of usage).

It is an object of the present invention to provide an arrangement for enabling a processing entity in a manner that is more secure at least in certain respects.

SUMMARY OF THE INVENTION

According to the present invention, there is provided a system comprising processing means needing the input of a set of control values for its proper working, a control entity for providing said set of control values to said processing means, and an enabling entity that can be placed in communication with said control entity to enable the latter to produce said control values; said enabling entity comprising:

first TP-word generation means for providing a first set of touch-point words, means for providing command indicators associated with touch-point words of said first set, build-word generation means for producing build words each having a value dependent on the value of a corresponding one of the touch-point words of said first set and its associated said command indicator, and means for passing said build words to the control entity, and said control entity comprising:

second TP-word generation means for providing a second set of touch-point words corresponding to those of the said first set, receive means for receiving said build words from the enabling entity, command-word generation means for generating command words each with a value dependent both on (a) the value of a respective one of said build words, and (b) the value of the touch-point word in said second set corresponding to the touch point word of said first set used in producing the build word referred to in (a), whereby the command word has a value dependent on the command indicator used in producing the related build word, and means for using the value of at least one said command word in producing said set of control values for input to said processing means;

said system further comprising coordination means for coordinating operation of said entities.

The command indicators may directly indicate the command-word values to be produced or may indirectly indicate these values (for example, each command indicator may reference a respective command-word storage location conceptually holding a corresponding command word the value of which can be set independently of the command indicator concerned). Where a sequence of command words is to be generated in which at least some of the words have the same value, then having the command indicator directly indicating command-word value means that the same command indicator must be used each time the corresponding command value is to be produced; however,if the command indicator is only an indirect indication of command-word value, then different command indicators can be translated by the command word generation means to the same command word value.

The command indicators can be provided either independently of the ordering of the touch-point words of the first set or, preferably, by the positions of the associated touch point words in the first set (in this case, then the command indicator will generally only be an indirect indication of command-word value).

In many cases the processing entity will operate cyclically and will need said set of control values to be supplied thereto each processing cycle by the control means. This may be achieved in a number of ways, including by generating the same (or different) sets of touch point words each cycle or by storing the first and second sets and reusing them multiple times. In a preferred embodiment, a said second set of touch point words and the corresponding set of build words are stored in the control entity and used for multiple processing cycles.

Preferably, the build-word generation means comprises a memory holding a lookup table containing build-word values, the lookup table being logically organised as columns referenced by command indicator and rows referenced by touch-point-word value. It will be appreciated that in the present context, the terms "rows" and "columns" have no special individual significance and are interchangable.

As regards the command-word generation means, this advantageously comprises:

function-evaluation means for evaluating any selected one of a plurality of predetermined functions each taking build words as arguments, selection means for selecting one of said plurality of functions as the said selected one in dependence on the value of a current touch point word of the second succession, and means for applying a current build word to the function evaluation means, the result of the evaluation of the selected function by the function-evaluation means serving as a command word. Preferably, the function evaluation means takes the form of a memory holding a lookup table containing command word values, this lookup table being logically organised as columns associated with respective ones of said functions, and rows associated with respective build word values.

Preferably, the control values are provided by the control entity to the processing entity over a common path.

According to another aspect of the present invention, there is provided an enabling entity for enabling a control entity to produce a set of control values for input to a processing entity that requires these values for its proper working, said enabling entity comprising:

TP-word generation means for providing a set of touch-point words, means for providing command indicators associated with said touch-point words, coordination means for coordinating operation of said TP-word generation means with corresponding means provided in said control entity, build-word generation means for producing build words each having a value dependent on the value of a corresponding touch-point word and its associated command indicator, and means for passing said build words to said control entity.

According to a further aspect of the present invention, there is provided a method of producing a set of control values for input to a processing entity that requires these values for its proper working, said method comprising the steps of:

(A) providing a first set of touch-point words each with an associated command indicator, (B) producing build words each having a value dependent on the value of a corresponding said touch-point word and its associated command indicator, (C) providing a second set of touch-point words corresponding to those of the said first set, (D) command-word generation means for generating command words each with a value dependent both on (a) the value of a respective one of said build words, and (b) the value of the touch-point word of said second set corresponding to the touch point word of said first set used in producing the build word referred to in (a), whereby the command word has a value dependent on the command indicator used in producing the related build word, and (E) using the value of at least one said command word in producing said set of control values for input to said processing entity;

steps (A) and (B) being carried in an entity distinct from that in which steps (C), (D) and (E) are effected.

BRIEF DESCRIPTION OF THE DRAWINGS

Embodiments of the present invention will now be described, by way of non-limiting example, with reference to the accompanying diagrammatic drawings, in which:

FIG. 5 is an argument table illustrating the generation of arguments (build words) by a build word generator of the FIG. 3 enabling entity;

FIG. 6 is a command-word table illustrating the generation of command words by the command word generator of the FIG. 4;

FIG. 7 is an argument table similar to that of FIG. 5 showing a first set of example values;

FIG. 8 is a command word table similar to that of FIG. 6 showing the generation of command words based on the arguments contained in the FIG. 7 argument table;

FIG. 9 is an argument table similar to that of FIG. 5 showing a second set of example values;

FIG. 10 is a command word table similar to that of FIG. 6 showing the generation of command words based on the arguments contained in the FIG. 9 argument table;

FIG. 14 depicts the argument table provided in the build word generator of the enabling entity of the FIG. 11 system;

FIG. 15 depicts the command word table provided in the command word generator of the control entity of the FIG. 11 system; and FIG. 16 is a table illustrating operation of the FIG. 11 system during two successive cycles of operation of the DES processing entity.

BEST MODE OF CARRYING OUT THE INVENTION

System Overview

Figure 2:
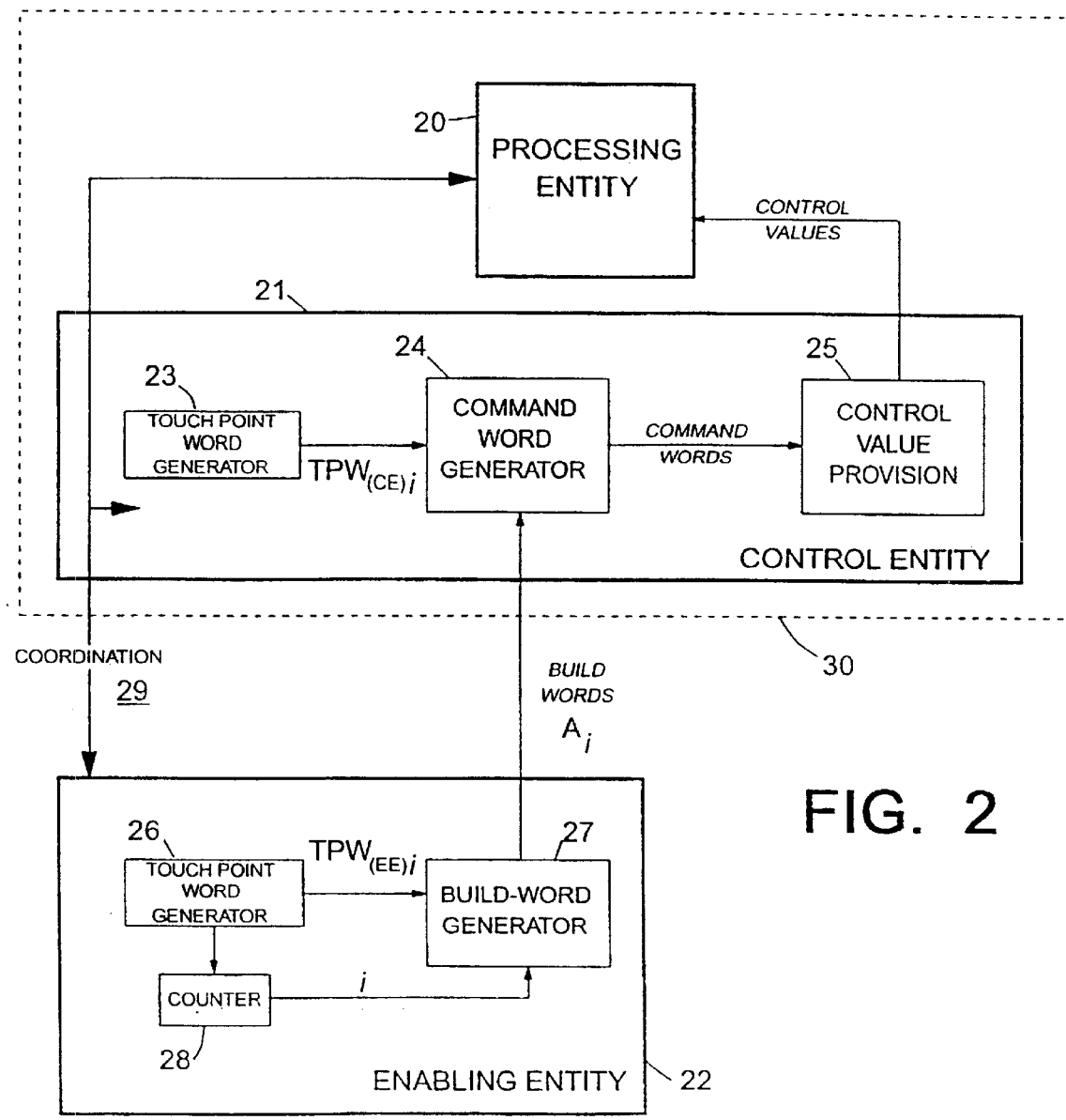
FIG. 2 is a block diagram showing the general form of a system embodying the present invention for effecting secure enablement of a processing entity, the system including a control entity and an enabling entity as well as the processing entity.

FIG. 2 illustrates the main elements of a system embodying the present invention. More particularly, a processing entity 20 is arranged to carry out some specified processing operation during the course of which it looks to be supplied at one or more particular points in the processing operation with control values that control the processing; these particular points are referred to herein as "touch points", being points of logical interaction of the processing entity with the world beyond itself. The processing entity will only function correctly if the correct control values are made available to it at each touch point; if a control value is incorrect, the processing entity will operate incorrectly and may be arranged to cease operation entirely. The nature of the processing carried out by the processing entity is not directly relevant to the present invention though the present invention does find particular application to cases where the processing is cryptographic in nature (for example, a cryptographic encoding/decoding algorithm such as the well-known DES algorithm). The processing entity 20 may be implemented in hardware and/or software.

The use of control values that need to be available to the processing entity at its processing touch points inherently permits a greater degree of security to be achieved than if the processing entity was simply controlled by an enable/disable signal easily capable of being forced to the enable state. In the present system, the provision of the control values to the processing entity is the responsibility of a control entity 21 which is intended only function correctly whilst in communication with an enabling entity 22. This enabling entity is, for example, an integrated circuit card (an ICC or "smartcard") that must be present in a card read/write unit of the control entity 21 to enable the latter to produce the control values needed for the correct operation of the processing unit; the enabling entity can take other forms such as a security server communicating with the control entity 21 over a network. The control entity 21 will generally (though not invariable) be co-located with the processing entity 20 in a common enclosure 30 which for security applications may be a tamper evident or tamper proof enclosure; hardware cicuitry of the control and processing entities may be integrated in the same chip.

Figure 1:
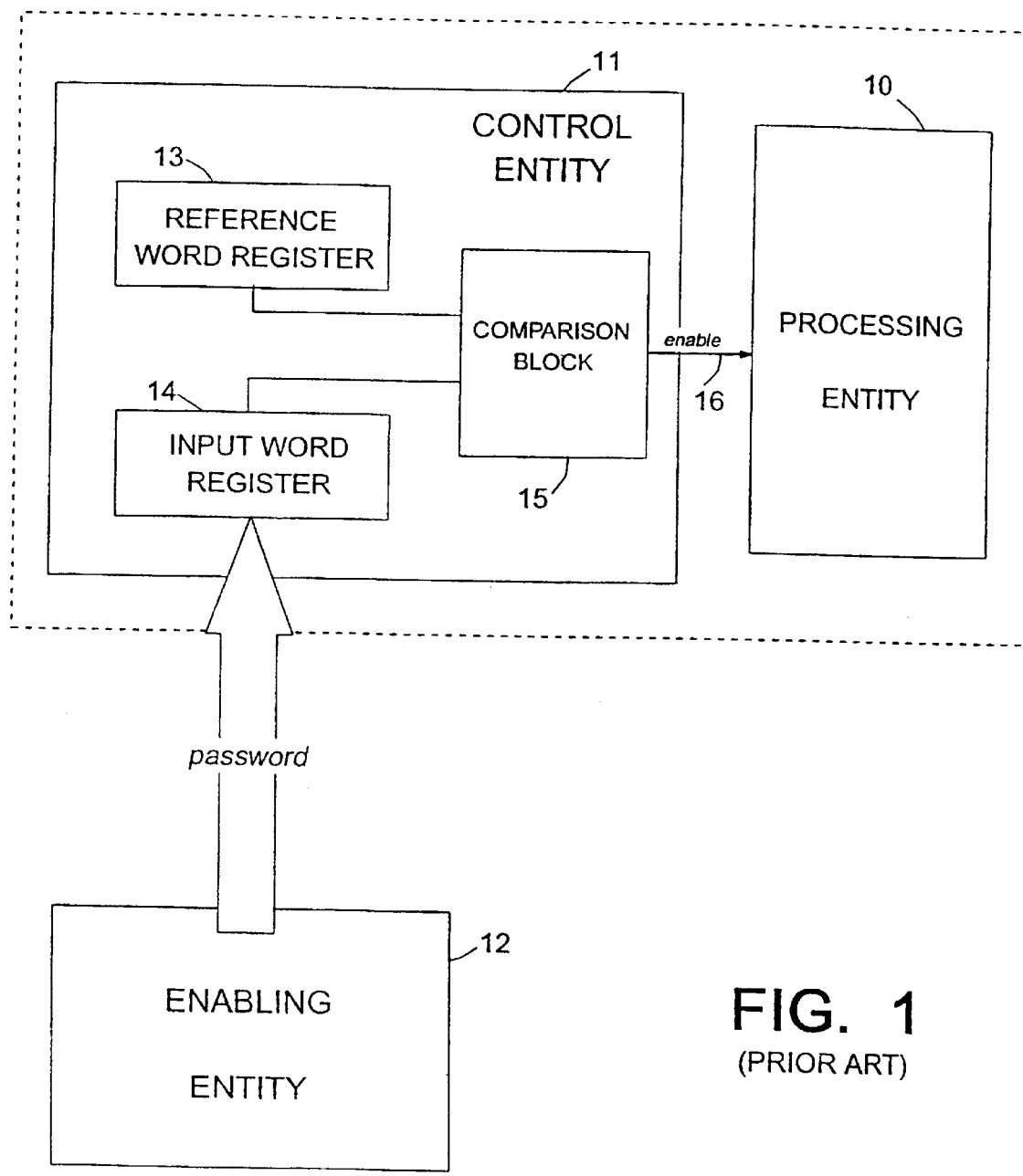
FIG. 1 is a block diagram of a prior art arrangement for controlling operation of a processing entity by means of a password supplied from an enabling

Of course, there would be little point in using control values to improve security if the control entity 21 could easily be forced into producing the correct control values; in other words, it should not be possible simply to force control-entity enable/disable logic into an enabled state in the manner described above with reference to FIG. 1. More particularly, reliance on comparing one or more passwords supplied by the enabling entity with reference copies held by the control entity should be avoided.

Accordingly, in the system of the present invention the enabling entity is arranged to supply enabling words that are actively used in the generation of control values rather than being compared with references copies held by the control entity. To this end, both the control entity and the enabling entity are arranged to generate the same reference words (herein referred to as "touch point" words because, as will be seen, they play a key role in the production of the control values for presentation at each touch point). The control entity 21 is thus provided with a touch point word (TP-word) generator 23 for generating an ordered set of touch point words $TPW_{(CE)i}$ where i is an index indicative of an ith word of this set, and the enabling entity 22 is provided with a touch point word (TP-word) generator 26 for generating an ordered set of touch point words $TPW_{(EE)i}$ that is the same as the set produced by generator 23. These sets may be finite or open-ended and the touch point words will generally (though not necessarily) be gnerated in a sequential fashion; in this case, the index i represents the order position of each word in each succession of touch point words so generated. Furthermore TP-word generators 23, 26 will generally be of the same form and will be initialised to a common state at an initialisation stage (this is represented in FIG. 2 by the coordination arrow 29. The TP-word generators will normally be pseudo-random number generators that are provided at initialisation with an initialisation vector, the same for both generators; this common initialisation vector is preferably generated in a secure manner by a process using, for example, the Diffie Hellman key exchange algorithm. Suitable pseudo-random number generators and secure initialisation-vector generation methods are well known to persons skilled and will not be further described herein. For most implementations it may be expected that binary electronic circuitry will be employed so that if each touch point word is "n" bits long, there are $2^n$ possible touch point values (TPVs).

The enabling entity 22 uses its touch point words $TPW_{(EE)i}$ to generate build words $A_i$ (see block 27 in FIG. 2) which it passes to the control entity 21; the control entity 21 then uses each build word $A_i$ together with its corresponding touch point word $TPW_{(CE)i}$ to derive a command word (see block 24) from which a control value is produced (see block 25—in fact, generally the command word value will be taken directly as a control value, though this need not be the case and block 25 may effect a translation of the command word value in some predetermined manner).

In the process of deriving a command word value from the touch point word $TPW_{(CE)i}$ of the control entity 21 and the build word $A_i$ supplied by the enabling entity 22, it is the build word $A_i$ that carries information indicating to the command word generator 24 which command word value should be produced. This value is directly or indirectly specified in the enabling entity by a command indicator; this command indicator is provided to the build word generator together with a corresponding touch point word to produce a build word whose value is dependent on the value of the command indicator. However, this build word can only be properly interpreted by the command-word generator to produce the required command-word value if the command-word generator is itself provided with the same touch point value as used in generating the build word. Generally, the command indicator will not directly indicate the required command-word value (though this is possible); instead, the command indicator will serve as an intermediate reference (that can be considered as a reference to a particular command word) to which the control entity can link a desired command word value thus, for example, the command-word generator may have storage locations conceptually holding associated command words to which the command indicators refer, the actual value of a command word then being the value held in the corresponding storage location (in this case, different command words can have the same value).

The command indicator can be generated in the enabling entity and associated with touch point words independently of any ordering of the latter. This arrangement enables differently ordered sequences of command word values to be produced by simply changing the order of command indicators provided to the build word generator. However, if only one ordering of command indicators is called for (either because only one ordering of command word values is required or because the association between command indicator to command word value is modifiable to achieve a required sequences of command-word values), then the command indicators may simply be the order position of the touch point words supplied to the build word generator. Accordingly, as shown in FIG. 2, the touch-point-word order position i is provided by counter 28 of the enabling entity 22 to the build-word generator 27 and the latter encodes the order position i of the current touch point word $TPW_{(EE)i}$ with the touch point value of this word to give a particular build word value; this value is then translated in block 24, in dependence on the value of the corresponding touch point word of the control entity, into the appropriate command word value. If the enabling entity 22 uses the wrong touch point word to form a build word, then the control entity 21 will translate the build word into a wrong command word value for the touch point concerned.

Preferably, there is a one-to-one relationship between touch point word and touch point; however, this is not essential, it being possible to have either more touch point words than touch points (in which case only certain touch point words are used for generating command words), or fewer touch point words than touch points (in which case either one or more command words are each used by block 25 to generate more than one control value, or the block 25 is arranged to provide additional control values not generated from command words). Even where there is not a one-to-one relation between touch point words and touch points, it is still possible to use the order position i of a touch point word to indicate the required command word value.

Reference has been made above to the need to coordinate the operation of the TP-word generators and to coordinate the operation of the processing entity 20 with that of the control entity 21. As indicated, this coordination is primarily concerned with having a common understanding at some initial point. It is not essential that the entities operate according to a common clock though this is possible and provides for simplicity of implementation. For example, if all three entities 20, 21, 22 were controlled by a common clock to operate in a coordinated sequence of steps, then at each step the enabling entity could produce a touch point word and generate a corresponding build word, the control entity could produce a touch point word and use it to translate the build word provided by the enabling entity into a command word from which a control value would be produced, and the processing entity could use the produced control value at a corresponding touch point for the step concerned (of course, as a practical matter, it would be desirable to introduce some pipelining into the overall process). However, alternative arrangements are possible; for example, in order to reduce communication between the enabling and control entities, the enabling entity could be arranged to produce a group of build words in response to receiving a prompting signal (a "heartbeat" signal in the detailed example to be described hereinafter) and in this case the clock driving operation of the enabling entity need not be related to the clock controlling the control entity. Of course with this latter arrangement, the group of build words passed to the control entity must be ordered such that the build word generated using $TPW_{(EE)i}$ can be related to the touch point word $TPW_{(CE)i}$ generated by the control entity. The generation of touch point words by the control entity could also be effected a group at a time in response to a prompting (heartbeat) signal, these words then being temporarily stored until required. A similar arrangement could be used to pass control values from the control entity 21 to the processing entity 20.

In the foregoing, the sets of touch point words produced by the control and enabling entities have been taken to be identical ordered sets thereby making is easy to associate a build word coming from the enabling entity with touch point word generated by the control entity that corresponds to the touch point word of the enabling entity used in generating the build word. However, other ways of effecting this association are possible; thus each build word may carry a label enabling the corresponding touch point word to be identified.

Cyclic Operation

Although the present invention is applicable to cases where the processing carried out by the processing entity is non-cyclic, it is expected that in most cases the processing will be cyclic in nature, such as the repeated operation of an encoding/decoding algorithm. In these latter cases, touch points will be defined in terms of one cycle of operation of the processing entity with the same control values being required at equivalent touch points in each cycle. The FIG. 2 arrangement can be applied to the control of such cyclic processing in a number of ways:

1). If only a small number of cycles are to be executed, the sequence of cycles can simply be treated as a single processing operation so far as the control and enabling entities are concerned, the cyclic nature of the required sequence of control values being ignored.

2). A more general solution is to reset the control and enabling entities at the start of each processing cycle with the TP-word generators being restarted to reproduce the same succesions of T touch point words as in the previous cycle and the same sequence of command indicators (index i in the FIG. 2 embodiment). A variant of this approach is to have the TP-word generators only produce once the set of touch point words required for a processing cycle and then store these words for re-use each cycle—in fact, instead of storing the touch point words produced by the enabling entity, these can be used to generate once the build words $A_i$ which are then stored.

3). Using the same touch point values and build words every cycle may not be desirable from a security viewpoint. To avoid this, the TP-word generators 23 and 26 could be caused periodically to produce new values at an interval not necessarily related to the cycle period and not necessarily regular.

4). An alternative solution to avoiding the use of the same touch point values and build words each cycle, is to leave the TP-word generators running across successive cycles but to re-start the sequence of command indicators each cycle.

In the detailed embodiment to be described, the third approach is adopted with the touch point generators 23, 26 being updated every heartbeat (where the heartbeat period is, for example, 10 minutes and therefore many times the duration of a processing cycle), and with one cycle's worth of touch point values and build values being stored in the control entity for repeated use by the command-word generator.

To aid further consideration of the present invention in relation to cyclically-operating processing entities, reference will next be made to FIG. 3 which generally illustrates the application of the control and enabling entities to deal with cyclic processing according to any of the approaches (2) to (4) above. To retain generality, the possibility of storing touch point words and build words is not depicted in FIG. 3; the use of a heartbeat signal for causing periodic updating of the TP-word generators is, however, illustrated. In the FIG. 3 arrangement, it is assumed that there are a number S of touch points each processing cycle, that the touch-point-word order position i is used as the command indicator applied to the build-word generator, and that the value of each command word is used directly as the control value for a corresponding one of the touch points—there are thus S command words per cycle. It is also assumed in the FIG. 3 arrangement that the number T of touch point words used per cycle is the same as the required number of command words, that is, T=S (as already noted, this need not be the case). As can be seen, the counter 28 now operates as a modulo-S counter, providing values of i from 0 to (S−1) for each cycle of operation of the processing unit (such operation can be flexibly achieved simply by resetting the counter at the start of each cycle). Even if the touch point word values provided by the TP-word generators 23 and 26 differ between cycles (which may be the case in approaches 3 and 4 above), the build word values will still appropriately encode the cycle order position $[i]_{mod.S}$ enabling the correct control values to be produced each cycle.

Figure 3:
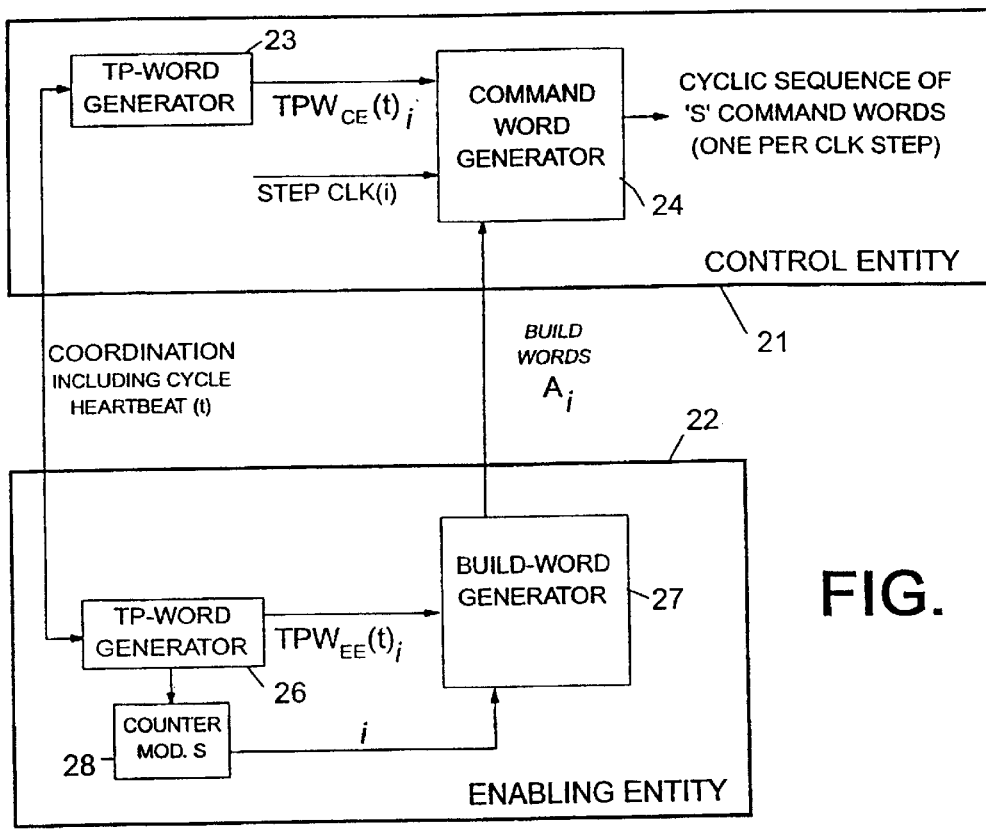
FIG. 3 is a block diagram similar to FIG. 2 but showing the system adapted to deal with a cyclically-operating processing entity.

The FIG. 3 embodiment further assumes that each touch point is associated with a corresponding processing cycle step, there thus being S such steps; the value i produced by counter 28 is thus an indicator of the processing step for which a build word relates. In the following description, references will be made to the processing step under consideration and unless otherwise indicated, this is to be understood in the context of a one-to-one association between touch point and processing step (it being appreciated that such a direct association is not essential to the present invention). Furthermore, it will be assumed that each processing step is carried out in coordination with a step clock which is also used to control operation of the control entity. More particularly, in the control entity a step clock signal CLK(i) is supplied to the command word generator 24 to cause the latter to generate a command word every step clock cycle; however, as already indicated, the TP-word generator 23 need not be controlled by the step clock. Instead, the TP-word generator 23 can be arranged to generate an ordered set of S touch point words $TPW_{(CE)i}$ independently of the step clock (for example, at the start of each processing cycle or following each updating of the TP-word generators depending on which implementational approach is taken); in this case the touch point words so generated are then stored for subsequent use by the command word generator as required.

Similarly, the enabling entity 22 need not, and generally will not, be controlled by the step clock. If the implementation adopted requires the TP-word generator 26 to generate a set of touch point words each processing cycle, then a coordinating cycle start signal is, however, preferably passed from the control entity to the enabling entity to indicate the start of a new cycle and to reset the counter 28. Depending on the implementation adopted, either at cycle start or following updating of the TP-word generator 26, the enabling entity then proceeds to generate an ordered set of S build words by generating a succession of S touch point words $TPW_{(EE)i}$ according to its own internal clock and supplying them together with the step indicator i from counter 28 to the build word generator 27. The set S of build words is then passed back to the control entity which temporarily stores them; these build words are then used in order with the corresponding touch point word $TPW_{(CE)i}$ by the command word generator 24.

The Build Word and Command Word Generators

A preferred conceptual way of viewing the operation of the build word generator and command word generator of the FIG. 3 system is to consider the command word generator as implementing a set of functions each associated with a particular value of touch point word TPW(CE)i and each taking the current build word value $A_i$ as an argument.

Figure 4:
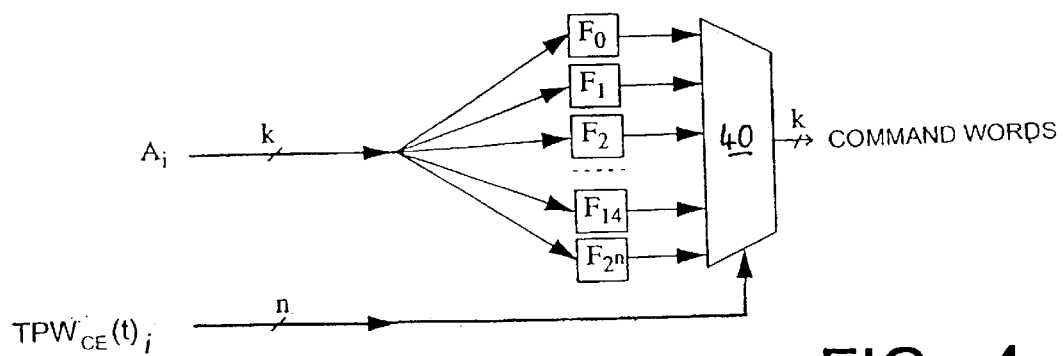
FIG. 4 is a diagram illustrating the conceptual form of an implementation of a command-word generator of the FIG. 3 control entity in which arguments supplied from the enabling entity are applied to a set of functions implemented by the command word generator.

The current value of the touch point word $TPW_{(CE)i}$ produced by the control entity is then used to select which function is to be used to translate the current build word into a command word. This approach is illustrated in FIG. 4 for the case where there are $2^n$ touch point values (each touch point word being encoded by n bits) and therefore $2^n$ functions, and $2^k$ different build word values (each build word being encoded by k bits). In FIG. 4, each build word $A_i$ is shown as being applied as an argument to all $2^n$ functions with a multiplexer block 40 then being used to select the resultant evaluated function value as the desired command word according to the value of the current touch point word $TPW_{(CE)i}$. It may be noted that in FIG. 4 the touch point word designation includes a parameter (t)—this parameter indicates the heartbeat number so that following the next heartbeat this parameter will have a value (t+1). With regard to the size of the build words and command words, this will depend on the number of different command values to be generated. For the present, the most general case will be considered where each processing step (touch point) requires a unique control value and thus command word value (it being assumed for clarity that the command word values are used directly as control values). Thus, if for simplicity we take the case where there are $2^k$ processing steps (touch points) per processing cycle, then there will need to be $2^k$ different command word values—the command words therefore need to be encoded with k bits. Clearly, there must be at least the same number of different build words but, as will be explained below, there may need to be more in certain circumstances—however, for the purposes of illustration in FIG. 4, it is assumed that the build words are also encoded with k bits.

The build word generator 27 may be viewed as providing argument values for use by the command word generator, these argument values being derived on the basis of the current touch point word value and its order position in the current cycle. The operation of the build word generator can be represented by a table (the "argument table"—see FIG. 5) in which for each of the $2^k$ steps of each processing cycle, an argument value is given for every one of the $2^n$ possible values of the touch point words $TPW_{(EE)i}$ generated by the enabling entity. Thus, representing the value of the touch point word $TPW_{(EE)i}$ by variable "m", for the first step (touch point) in a processing cycle the build word generator will produce argument $a_{m,1}$ whilst at the ith step it will produce an argument $a_{m,i}$ having a value here represented as "x".

The required number of different argument values in the argument table is the larger of $2^n$ and $2^k$ as will now be explained. For security reasons, for any given step it should preferably not be possible to generate the correct argument from the wrong value of touch point word. This leads to the requirement that an argument value should only appear once in any given column of the FIG. 5 argument table; there must therefore be at least $2^n$ different argument values. Furthermore, since the same touch point value may be generated for two (or more) steps during the same cycle, the argument values in any given row of the argument table must be different (otherwise the same command word would be produced by the command word generator at different steps whereas for the general case under consideration each step requires a unique command word); there must therefore be at least $2^k$ diffferent argument values. From this it follows that the required number of argument values is the larger of $2^n$ and $2^k$. This requirement is based on a number of premises which it is worth briefly recalling:

command word value collisions must be avoided for different values of touch point word provided by the enabling entity;

all command word values are different;

there are as many steps as different command values.

If any of these constraints is relaxed, then a lesser number of argument values could be used.

The operation of the command word generator 24 may also be represented by a table (the "command word table"—see FIG. 6) in which for each of the $2^n$ functions (one for each possible value of the touch point words $TPW_{(CE)i}$ produced by the control entity), a command word can be specified for every one of the possible argument values. As already indicated, the number of command word values is $2^k$ for the general case ($2^k$ steps each enabled with a different control value); these command word values are represented by $C_1, C_2, C_3 \ldots C_i \ldots$ where the suffix indicates the step concerned. For clarity, only a few command word values are shown in FIG. 6. It should be noted that the size of the command word table is the number $2^n$ of functions multiplied by the number of argument values, that is, by the larger of $2^n$ and $2^k$.

By way of illustration of the working of the argument and command word tables, if a command word $C_i$ is to be provided at step i, then considering the case where during a particular cycle the touch point word value of m is produced by the TP-word generators 23 and 26 in correspondence to step i, the FIG. 5 argument table shows that an argument value of x will be produced by the build word generator 27. This argument value x is passed to the command word generator where function $F_m$ is used to translate it into command word value $C_i$—see the FIG. 6 table. Of course, since any value of touch point word may be generated at step i, the argument table and command value table need to reflect this.

Consideration will next be given as to how the argument and command word tables can conveniently created. Dealing first with the argument table in the enabling entity:

(i)—If k>n or k=n, then the table should be filled up row by row, the first row being filled with the $2^k$ possible argument values, the second row with the first row values shifted one location to the right or left, and so on. FIG. 7 shows an example argument table for k=3 and n=2. Any two rows or any two columns in the table may be swapped if desired.

(ii)—If n>k, then the table should be filled column by column but otherwise as in (i) above. FIG. 9 shows an example argument table for k=2 and n=3. Again, any two rows or two columns in the table may be swapped if desired.

Building the command word table may be done as follows:

(i)—If k>n or k=n, then the filling out of the table is fully determined as there are as the same number of argument values as command word values (that is, $2^k$ values). For each of the $2^n$ functions, each argument value translates into a corresponding one of the command word values, this command word value being that required for the step represented by the argument value (in the light of the current touch point value). FIG. 8 illustrates the command word table corresponding to the FIG. 7 argument table. By way of illustration, if at step '4' the touch point value generated is 2, the argument table of FIG. 7 produces an argument value of 2; therefore, in the command word table of FIG. 8, the cell identified by an argument value of 2 and the function for touch point value 2 ($F_2$) must be filled with the command word value appropriate for step '4', namely $C_4$.

(ii)—If n>k, there will be more argument values ($2^n$) than required command values ($2^k$) with the result that the table is larger than needed if there were the same number of arguments and command word values. Thus, whilst the contents of some of the cells of the table are predetermined (as for case (i) above), there are other cells whose contents are not predetermined. This can be seen by reference to FIG. 10 that illustrates the command word table corresponding to the FIG. 9 argument table. By way of illustration, if a touch point value of 2 is generated at some given step, then only $2^k$ argument values (in the present case, 4 argument values) are required to identify the command word appropriate to the step concerned—however, there are $2^n$ possible argument values (here, 8 values) so that there are $2^{(n-k)}$ argument values (4 values) which are undefined. Of course, ideally these argument values should not lead to the generation of a possibly correct command word but if the command words are defined on k bits and there are $2^k$ command words required, it is not possible to insert an incorrect command for all possible incorrect arguments. It is therefore necessary either to increase the length of the command words by one bit to enable incorrect values to be inserted in the table, or to accept the possibility of a correct command being generated from an incorrect argument value. It may be noted that in fact frequently there will be less than an exact number of $2^k$ processing steps so that there will generally be at least one spare command value that can be used as an always incorrect value.

The foregoing discussion was in respect of the general case of there being $2^k$ steps with touch points, each step having a unique associated control (command word) value. Certain special cases are, however, of interest. Thus, as just mentioned above, there may be less than $2^k$ steps but the command words are still coded on k bits; in this case, it is possible to reduce the size of the argument table (as there are less steps) but not the size of the command word table.

Another special case is where the same command word value is used at more than one step; in this case, for the steps that have the same associated command value, the corresponding columns of the argument table can contain the same sequence of argument values. By mapping all of these steps onto the same column, it is possible to reduce the number of columns of the argument table (for example, if the same command word value is used at steps 3, 9 and 11, then the columns for steps 9 and 11 can be removed from the argument table provided that the values of i=9 and i=11 are mapped onto the same column as for i=3). It may also be possible to reduce the number of bits used to encode the command word values and if only p bits are needed to encode the command word values (p<k), then the size of the argument table will be reduced to no greater than $2^n2^p$ (there being no need to have more columns than the possible number of command word values). The number of different argument values is now the larger of $2^n$ and $2^p$.

Other possible special cases include the acceptance of a limited risk of the correct command value being generated when the enabling entity generates a wrong touch point value; whilst this may enable a smaller argument/command-word table to be used, the accompanying reduction in security makes this a non-preferred approach (in any event, for the same reduction in security, a larger saving on table size can be achieved by shortening of the command words).

Implementation of the argument and command word tables can, of course, be achieved using lookup tables held in memory. However, other implementations are also possible such as by combinational logic blocks.

It should also be noted that the above-described argument/function approach to implementing the build word generator and command word generator is not the only possible approach and even this approach could equally be characterised as the touch point word generated by the control entity being supplied as an argument to a set of functions one of which is then chosen by the build word provided by the enabling entity.

Example Implementation

Figure 11:
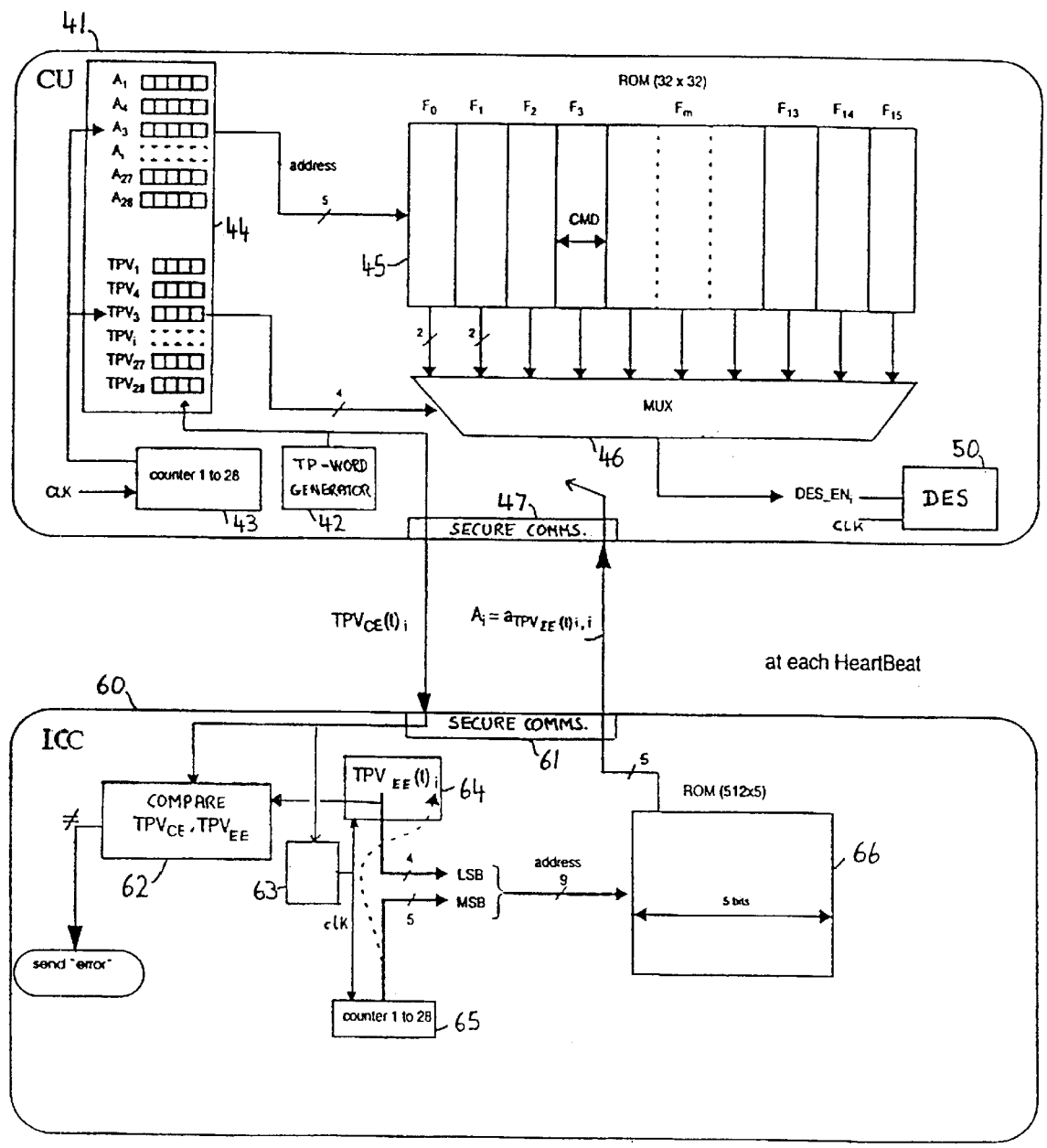
FIG. 11 is a diagram of a particular implementation of the FIG. 3 system using the FIG. 4 form of command word generator and employing lookup tables for argument (build word) generation and command word generation.

FIG. 11 is a block diagram of a specific implementation of the FIG. 3 system using argument and command word tables held in memory. In this example, the processing entity being controlled is a DES encrypt/decrypt block 50 that forms part of a cryptographic unit (CU) 41 also including the control entity (elements 42 to 46). The enabling entity takes the form of an ICC (smartcard) that can be placed in communication with the cryptographic unit through a smartcard read/write unit (not shown). Communication between the cryptographic unit 41 and smartcard 60 is effected through secure communication blocks 47 and 61 respectively provided in the unit 41 and smartcard; these blocks ensure the secrecy of communication between the enabling and control entities and may be implemented using well known techniques. The purpose of the overall arrangement is to ensure that the DES block 50 cannot operate without the continuing presence of a valid smartcard 60.

Figure 12:
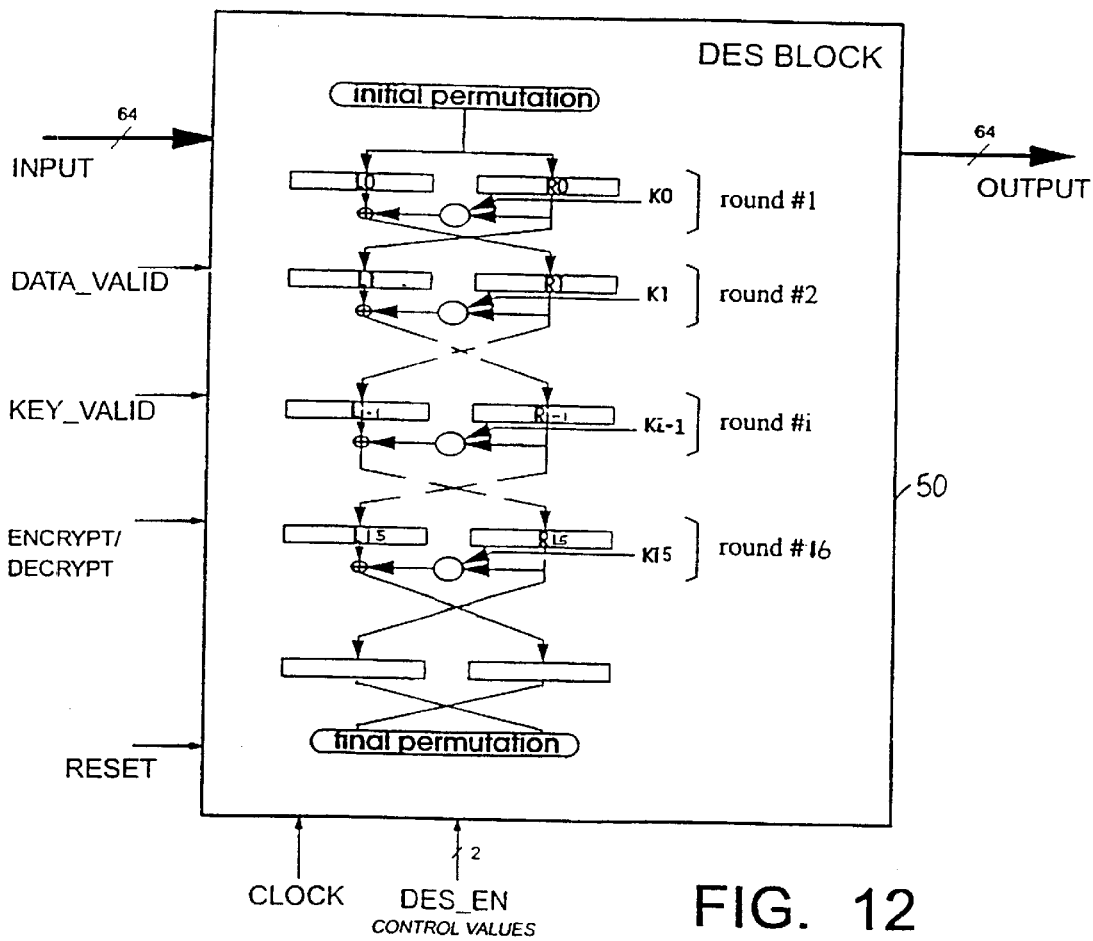
FIG. 12 is a diagram of a DES encrypt/decrypt block forming the processing entity of the FIG. 11 system.

The DES block 50 implements the DES encrypt/decrypt algorithm which, as is well known, involves sixteen rounds of processing for each 64-bit input block (see FIG. 12). It is not the present purpose to describe the DES algorithm in detail but simply to note certain features relevant to controlling the algorithm by control values. Thus, it may be noted that each processing round involves implementing a permutation and substitution function using the output from the previous round and a subkey; the subkey is different for each round with the subkey for one round being derived from that of the previous round by succesive shifting and permutation operations. For some subkeys the shifting operation involves only one shift whereas for other subkeys two shifts are required—in total over the sixteen rounds, 28 shifts are effected. In the DES implementation under consideration, one shift can be effected every clock cycle so that 28 clock cycles are needed to carry out the sixteen rounds making up the main body of the DES processing (see FIG. 13). In terms of the present invention, the processing effected during each clock cycle is considered as a processing step to be controlled by control values supplied at a corresponding touch point.

The other main point to note concerning the DES algorithm is that the input to each round is divided into two 32 bit halves which are swapped over, and the last round is followed by a further swapping of the two halves of the output from the last round. This can be implemented as effecting a swapping operation for the first fifteen rounds and but not for the final round. In the present embodiment of the invention, the carrying out of this swapping operation is controlled by the control values supplied to the DES block 50 as the signal DES_EN. This signal is a 2 bit signal giving four possible control values of which only three are used as follows:

DES_EN="01" indicates that round processing can proceed involving the carrying out of a swapping operation; this value is used to initiate processing during the first fifteen rounds.

DES_EN="11" indicates that round processing can proceed but that no swapping is required; this value is used to initiate the final round of processing.

DES_EN="00" indicates that round processing is to be paused; this value is used to pause round processing during clock cycles where a subkey that requires two shifts is being first shifted.

Figure 13:
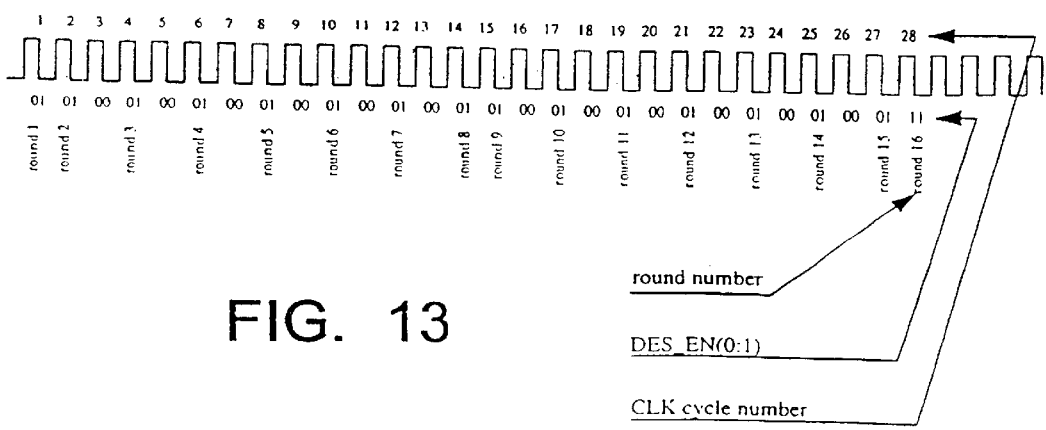
FIG. 13 is a diagram illustrating the relationship between processing steps of the FIG. 12 processing entity and the supply of control values by the control entity of the FIG. 11 system.

FIG. 13 shows the required control values for each processing step (clock cycle) and their relationship to the processing rounds.

The DES_EN signal may be used to control hardware circuitry controlling the flow of processing or may be temporarily held in a register and read by the DES block as needed, this latter arrangement being appropriate when the DES block is at least partially implemented in program code run by a dedicated or general purpose processor.

It should be noted that in the embodiment of FIGS. 11 and 12, the control values are all applied from the control entity to the processing entity (DES block 50) over a common signal path, namely the lines carrying the signal DES_EN. It is therefore not possible to circumvent the operation of the control entity by forcing the control-value input lines to the processing entity to particular values because in this embodiment the values on these lines (the DES_EN lines) must vary for proper operation of the processing block. This multiplexing of control values for different touch points over the same path from the control entity can usefully be effected independently of the form of the control entity, that is, even for versions that do not embody the present invention.

The control and enabling entities of FIG. 11 will next be described but first the bit sizes of the various quantities involved will be reviewed. In the above-described arrangement of the DES block there are 28 steps under touch point control leading to steps being encoded on 5 bits, that is, k=5. As regards the value of n, the number of bits used for the touch point words in the present example is 4, so that there are sixteen possible touch point values and sixteen functions. The size of the arguments in the argument table is therefore set by k (as it is large than n). The command words are used directly as the control values and are thus two bits long.

The control entity comprises a touch point word generator 42 which at each heartbeat (t) from a timing unit (not shown) generates 28 touch point word values $TPV_1$ to $TPV_{28}$ that are temporarily stored in memory 44. At the same time, these 28 values are passed, together with the heartbeat signal, to the enabling entity 60 over the secure communications link; the enabling entity responds with a set of 28 build words $A_j$ which are also temporarily stored in memory 44. The control entity is now ready to build 28 control values for controlling a processing cycle of the DES block 50. A modulo-28 counter 43 incremented by the same clock CLK as used to clock the DES block, is now used to control the output at each clock cycle (and thus at each DES processing step) of the corresponding pairing of touch point value and build word from the memory 44 (that is, pairings $TPV_1,A_1$; $TPV_2,A_2$; ... $TPV_{28},A_{28}$). The build word of each pairing is used to access a command word table stored in ROM 45 whilst the touch point value of the pairing selects the appropriate table output via multiplexer 46; the command word thus selected is then applied as the control value DES_EN for the current DES processing step.

The stored touch point words and build words are re-used each processing cycle until replaced by new values generated at the next heartbeat signal (this latter typically has a period many times that of a processing cycle).

The enabling entity 60 includes a touch point word generator 64 that is coordinated with the generator 42 of the control entity when the enabling and control entities are first placed in communication and a first heartbeat signal sent. As previously mentioned, this coordination may involve the generation of a common secret that is used as an initialisation vector for the TP-word generators 42 and 64.

At each subsequent heartbeat, a control unit ' of the enabling entity is responsible for updating the TP-word generator 42 and causing it to generate a succession of 28 touch point values, each value being used together with the corresponding step value i from a modulo-28 counter 65, to address an argument table held in ROM 66. The resultant set of 28 build words are then passed back to the control entity 41.

The touch point word values generated by the TP-word generator 64 of the enabling entity are also compared in block 62 with the corresponding touch point word values passed by the control entity. Any discrepancy results in the generation of an error message.

Figure 14:
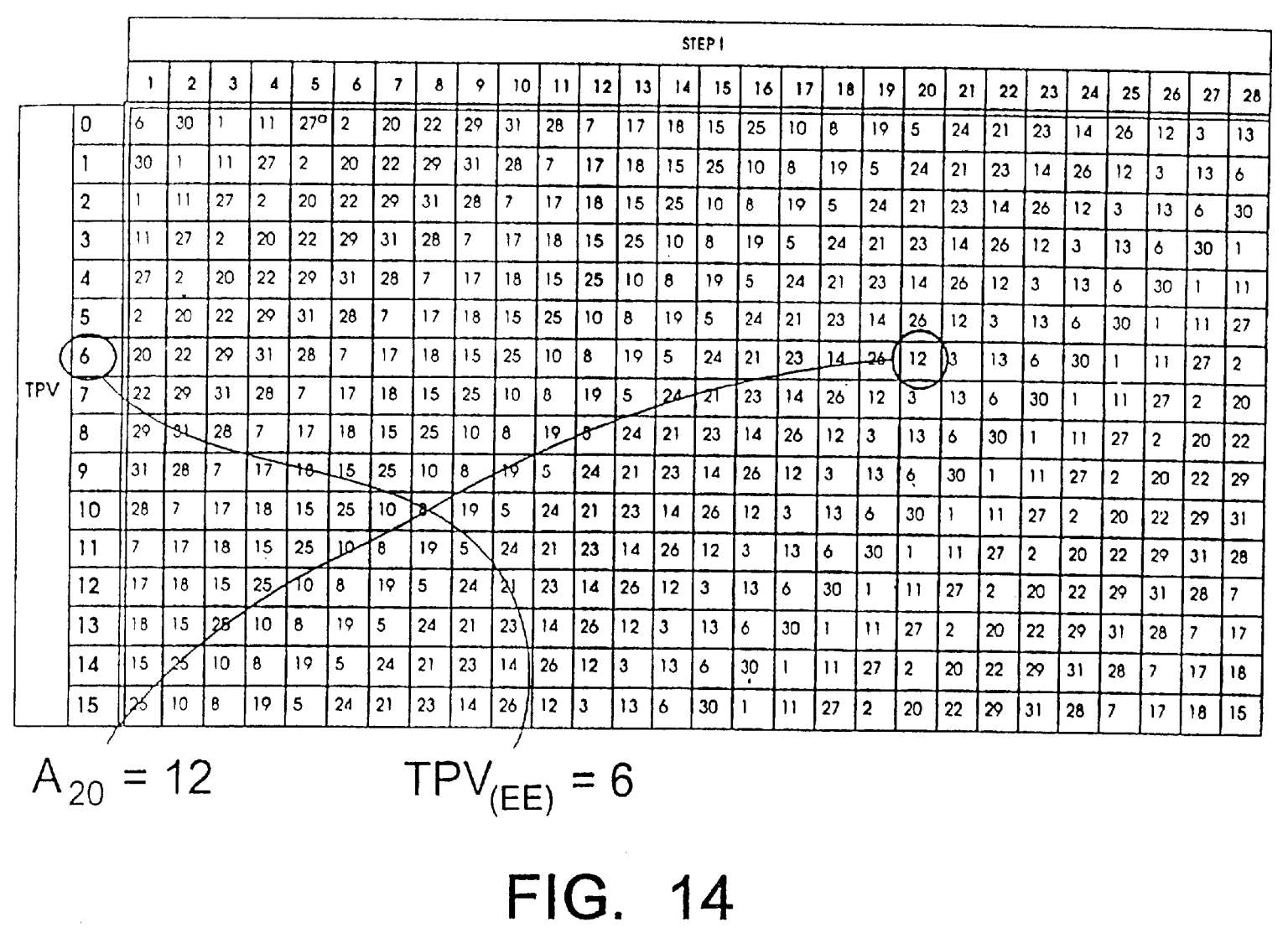

FIG. 14 shows the argument table held in ROM 66 of the enabling entity 60 and FIG. 15 shows the command word table held in ROM 45 of the control entity 41. By way of illustration, consider the case of where a touch point value of "6" is generated at step 20 of a processing cycle. In the enabling entity, a touch point value $TPV_{(EE)}$ of "6" for step 20 will give an argument value $A_{20}$ of "12" according to the argument table of FIG. 14. In the control entity, an argument value of "12" applied to the function $F_6$ selected by the touch point value $TPV_{(CE)}$, will give a command value of "00" according to the command value table of FIG. 15. Reference back to FIG. 13 shows that for step 20 (clock cycle 20), a control value of "00" is required.

FIG. 16 gives an example illustrating operation of the control and enabling entities during two processing cycles occurring in different heartbeat periods (t) and (t+1). FIG. 16 shows, for all 28 cycle steps, a typical sequence of touch point values $TPV_i$ (different between the two heartbeat periods), the selected functions $F_{TPVi}$ in the control entity, the arguments $A_i$ produced by the enabling entity, and the resultant DES_EN values. The example includes for the first heartbeat period (t) the above illustration relating to step 20 and a TPV value of "6".

It will be appreciated that the FIG. 11 embodiment may be modified in a number ways. For example, the enabling entity 60 may be responsible for producing the heartbeat signal and passing it to the control entity rather than the other way around. Furthermore, comparison of the touch point values could be effected in the control entity 41 rather than in the enabling entity.

What is claimed is:

1. A system comprising processing means needing the input of a set of control values for its proper working, a control entity for providing said set of control values to said processing means, and an enabling entity that can be placed in communication with said control entity to enable the latter to produce said control values; said enabling entity comprising:

first touch-point word (TP-word) generation means for providing a first set of touch-point words, means for providing command indicators associated with touch-point words of said first set, build-word generation means for producing build words each having a value dependent on the value of a corresponding one of the touch-point words of said first set and its associated said command indicator, and means for passing said build words to the control entity, and said control entity comprising:

second TP-word generation means for providing a second set of touch-point words corresponding to those of said first set, receive means for receiving said build words from the enabling entity, command-word generation means for generating command words each with a value dependent both on (a) the value of a respective one of said build words, and (b) the value of the touch-point word in said second set corresponding to the touch point word of said first set used in producing the build word referred to in (a), whereby the command word has a value dependent on said command indicator used in producing the related build word, and means for using the value of at least one said command word in producing said set of control values for input to said processing means;

said system further comprising coordination means for coordinating operation of said entities.

2. A system according to claim 1, wherein said command indicator associated with a said touch point word of the first set is independent of said position of that word in the set.

3. A system according to claim 1, wherein said coordination means comprise heartbeat means for exchanging a heartbeat signal between said enabling and control entities, said heartbeat signal causing said TP-word generation means to generate new first and second sets of touch point words.

4. A system according to claim 1, wherein said TP-word generators are pseudo-random number generators coordinated by said coordination means upon the control and enabling entities being first placed in communication, said coordination involving the seeding of both TP-word generators with the same initialisation vector.

5. A system according to claim 1, wherein at least some of said control values are provided from the control entity to the processing entity over the same path.

6. A system according to claim 1, wherein said processing entity operates cyclically and needs said set of control values to be supplied thereto each processing cycle by the control entity, said first and second TP-word generation means being operative to generate said first and second sets of touch point words with sufficient touch point words for one processing cycle, said first set of touch point words being used by the build-word generation means to generate a corresponding group of build words and the system including storage means for storing said group of build words and said second set of touch point words, said command-word generation means being operative to reuse the stored touch point words and build words for each of a plurality of processing cycles.

7. A system according to claim 6, wherein said storage means is provided in the control entity.

8. A system according to claim 1, wherein said processing entity operates cyclically and needs said set of control values to be supplied thereto each processing cycle by the control entity, said first and second TP-word generation means each being operative to generate the same set of touch point words during each of a plurality of processing cycles.

9. A system according to claim 8, wherein there are the same number of command words generated each processing cycle as there are touch point words in said first and second sets, the value of each command word being used directly as a corresponding said control value of said set of control values.

10. A system according to claim 1, wherein said build-word generation means comprises a memory holding a lookup table containing build-word values, said lookup table being logically organised as columns referenced by said command indicator and rows referenced by touch-point-word value.

11. A system according to claim 10, wherein within each column and row of said lookup table all build-word values are different.

12. A system according to claim 1, wherein said command-word generation means comprises:
   function-evaluation means for evaluating any selected one of a plurality of predetermined functions each taking said build words as arguments,
   selection means for selecting one of said plurality of functions as said selected one in dependence on the value of a current said touch point word of said second set, and
   means for applying a current said build word to said function evaluation means,
the result of the evaluation of said selected one of said functions by said function-evaluation means serving as a said command word.

13. A system according to claim 12, wherein said function evaluation means takes the form of a memory holding a lookup table containing command word values, this lookup table being logically organised as columns associated with respective ones of said functions, and rows associated with respective build word values.

14. A system according to claim 1, wherein said first and second sets of touch point words are ordered sets with corresponding words in corresponding positions in each set, said build words being transferred to the control entity in an ordering reflecting said positions of the touch point words used for their generation, and the command-word generation means using this build-word ordering and the ordered nature of the second set to determine which build word and touch point word to use together.

15. A system according to claim 14, wherein said command indicator associated with a said touch point word of the first set is said position of that word in the set.

16. A system according to claim 15, wherein said processing entity operates cyclically and needs said set of control values to be supplied thereto each processing cycle by the control entity, said first and second TP-word generation means being operative to generate said first and second sets of touch point words with sufficient touch point words for a plurality of processing cycles, the command indicator associated with a said touch-point word of said first set being taken as said position of the word relative to a subset of said first set formed by the touch point words to be used in respect of a current said processing cycle.

17. A system according to claim 15, wherein said build-word generation means comprises a memory holding a lookup table containing build-word values, said lookup table being logically organised as columns referenced by said command indicator and rows referenced by touch-point-word value; said system being arranged to generate at least two command words having the same value using touch point words having different positions in said first set and thus different command indicators, said lookup table using the same column for said different command indicators and said build-word generation means further including means for referencing this column when presented with a touch point word with any of said different command indicators.

18. An enabling entity for enabling a control entity to produce a set of control values for input to a processing entity that requires these values for its proper working, said enabling entity comprising:

touch-point word (TP-word) generation means for providing a set of touch-point words,
   means for providing command indicators associated with said touch-point words,
   coordination means for coordinating operation of said TP-word generation means with corresponding means provided in said control entity,
   build-word generation means for producing build words each having a value dependent on a corresponding said touch-point word and its associated command indicator, and
   means for passing said build words to said control entity.

19. An enabling entity according to claim 18, wherein the said command indicator associated with a said touch-point word is the position of that word in the set of touch point words.

20. An enabling entity according to claim 18, wherein said build-word generation means comprises a memory holding a lookup table containing build-word values, the lookup table being logically organised as columns referenced by command indicator and rows referenced by touch-point-word value.

21. An enabling entity according to claim 20, wherein within each column and row of said lookup table all build-word values are different.

22. An enabling entity according to claim 20, wherein said lookup table uses the same column for different command indicators, said build-word generation means further including means for referencing this column when presented with a touch point word with any of said different command indicators.

23. A method of producing a set of control values for input to a processing entity that requires these values for its proper working, said method comprising the steps of:
   (A) providing a first set of touch-point words each with an associated command indicator,
   (B) producing build words each having a value dependent on the value of a corresponding said touch-point word and its associated command indicator,
   (C) providing a second set of touch-point words corresponding to those of said first set,
   (D) command-word generation means for generating command words each with a value dependent both on (a) the value of a respective one of said build words, and (b) the value of the touch-point word of said second set corresponding to the touch point word of said first set used in producing the build word referred to in (a), whereby the command word has a value dependent on the command indicator used in producing the related build word, and
   (E) using the value of at least one said command word in producing said set of control values for input to said processing entity;
steps (A) and (B) being carried in an entity distinct from that in which steps (C), (D) and (E) are effected.

* * * * *